United States Patent

Provancher

[11] 4,262,186
[45] Apr. 14, 1981

[54] LASER CHEM-MILLING METHOD, APPARATUS AND STRUCTURE RESULTING THEREFROM

[75] Inventor: Donald A. Provancher, Chula Vista, Calif.

[73] Assignee: Rohr Industries, Inc., Chula Vista, Calif.

[21] Appl. No.: 846,211

[22] Filed: Oct. 27, 1977

[51] Int. Cl.³ .............................................. B23K 9/00
[52] U.S. Cl. ...................... 219/121 LH; 219/121 FS; 219/121 LP; 219/121 LK; 156/643; 346/76 L
[58] Field of Search ..... 219/121 L, 121 LM, 121 EB, 219/121 EM; 346/76 L; 29/423, 424; 156/272, 643

[56] References Cited

U.S. PATENT DOCUMENTS

| | | | |
|---|---|---|---|
| 3,314,073 | 4/1967 | Becker | 219/121 L |
| 3,549,733 | 12/1970 | Caddell | 219/121 LM |
| 3,632,205 | 1/1972 | Marcy | 219/121 L |
| 3,736,402 | 5/1973 | Mefferd et al. | 219/121 L |
| 3,742,182 | 6/1973 | Saunders | 219/121 LM |
| 3,770,529 | 11/1973 | Anderson | 219/121 L |
| 4,092,442 | 5/1978 | Agnihotri et al. | 156/643 |
| 4,117,301 | 9/1978 | Goel et al. | 219/121 LM |

*Primary Examiner*—Gene Z. Rubinson
*Assistant Examiner*—M. Paschall
*Attorney, Agent, or Firm*—Patrick J. Schlesinger; Frank D. Gilliam

[57] ABSTRACT

The materials to be chem-milled are coated with a maskant material, a template having a specific hole pattern is then placed over the masked surface of the material. A laser beam is then directed towards the template and is scanned either manually or by numerical control means along the hole pattern. The laser is maintained at each hole for a sufficient length of time to enable the maskant to be burned from the material. The material is then chem-milled by any conventional means thereby forming holes through the material at the maskant free areas. The remaining maskant is then removed from the surface of the material.

9 Claims, 6 Drawing Figures

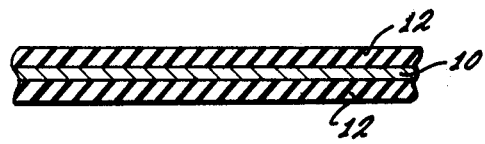
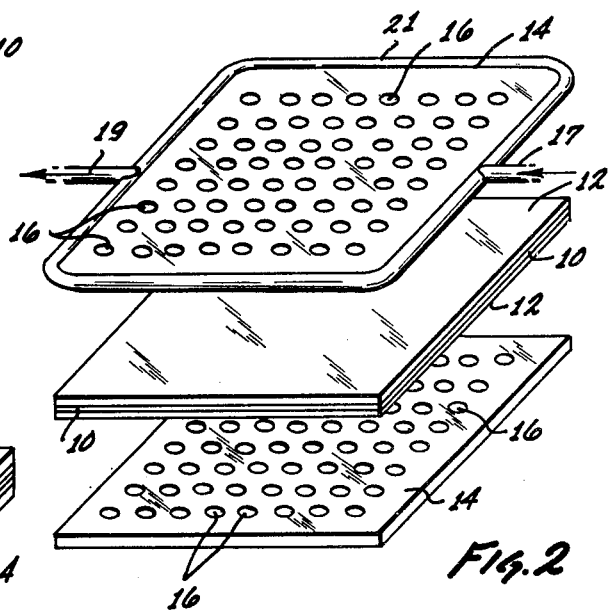
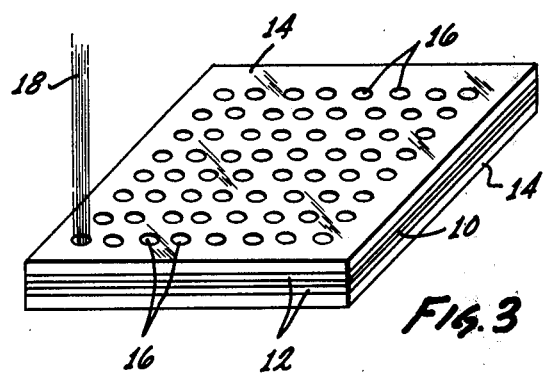
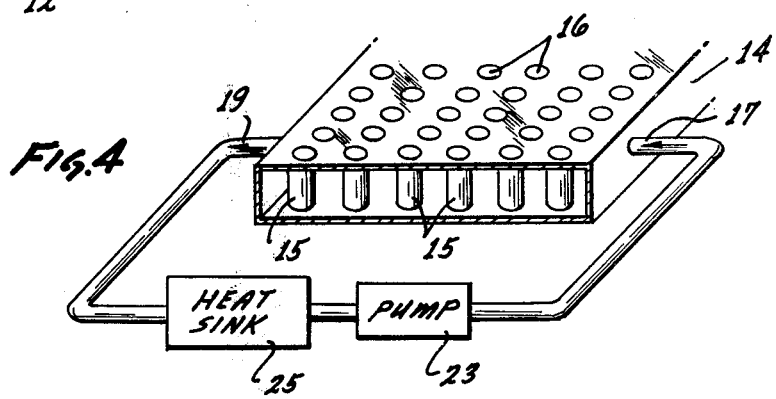
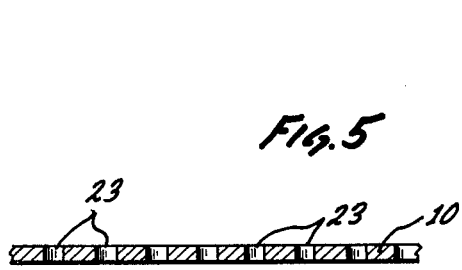
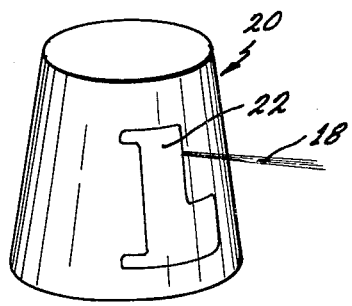

LASER CHEM-MILLING METHOD, APPARATUS AND STRUCTURE RESULTING THEREFROM

BACKGROUND OF THE INVENTION

The invention relates to chem-milling and, more specifically, to preparing the surface of material coated with chem-mill resistant maskant in the areas desired to be chem-milled.

The conventional method of preparing material to be chem-milled in those specific areas is to coat the surface of the material with a chem-mill resistant maskant material and then mechanically punching or drilling holes of a smaller diameter than the desired resultant diameter hole through the maskant and/or maskant and the material. This method, although highly successful for certain utilization of perforated finished material, has been found to cause an increase in the occurrence of material fatigue and to highly stress the material adjacent the hole which causes warpage of the material requiring the additional operation of flattening the material prior to use.

The problems existing in the current phase of the art have not been successfully overcome until the emergence of the instant invention.

SUMMARY OF THE INVENTION

The invention provides a convenient method for producing a perforated sheet of material that has uniform hole size, good fatigue properties and does not require the additional operation of flattening prior to ultimate use.

The main object of this invention is to produce a sheet of perforated material with reduced fatigue properties and stress reduction around the perforations to prevent warpage of the material.

Another object of this invention is to produce a sheet of uniformly perforated material with a reduction of manufacturing steps in such materials as titanium, inconel, aluminum and other types of material subject to chem-milling.

Another object of the invention is to produce an acoustic panel containing perforations of selected and uniform size.

Other objects, features and advantages of the present invention will become apparent from the following description taken in conjunction with the accompanying drawings.

BRIEF DESCRIPTION OF THE DRAWINGS

FIG. 1 is a showing of a cross-section of material maskant applied prior to the chem-milling operation.

FIG. 2 is an exploded perspective view of the material, maskant, templates and cooling tube.

FIG. 3 is a perspective showing of the material, maskant and template in place for the laser drilling of the maskant.

FIG. 4 is a partial cutaway perspective view of a second type template having additional cooling means.

FIG. 5 is a showing of a finished flat piece of material with chem-milled apertures.

FIG. 6 is a showing of material to be scribed in the form of conical section.

The same numeral reference will be used to denote the identical part or element throughout the drawings and specifications.

DESCRIPTION OF THE FIRST PREFERRED EMBODIMENT

Referring now to FIG. 1, a piece of material 10 of the type normally subjected to a chem-milling process is coated with a maskant 12 resistant to the chemicals encountered in the chem-milling process. This maskant can be applied by any known means, such as, but not limited to, dipping, spraying, brushing, etc. A maskant found suitable for conventional chem-milling precesses is that product having the trade name Dap Coat 1001. It should be understood that various other maskants are available that will work equally as well in practicing the instant invention. The material 10 to be chem-milled could be of any thickness suitable for any type of chem-mill process, as for example, 1/1000ths of an inch and up within practical limits.

Referring now to FIGS. 2 and 3, after the material 10 has been coated with the maskant 12, a template 14 is placed over at least one side of the material and secured thereto by any convenient means, so as to prevent any relative movement between the template 14 and the material 10. The template has been predrilled, or apertures have been formed by various other methods, to provide the plurality of selectively sized and positioned apertures 16. These apertures 16 can take many shapes, forms and patterns depending on the shape of the required finished openings in the material 10. These apertures 16 will be sized slightly smaller than the finished aperture size desired, so that sufficient material for finishing but not an excess of material may be removed during the chem-milling process without exceeding the required size. It should be understood that for thin material 10 to be chem-milled, only one template 14 may be required, and with thicker material it may be desirable to have a second template 14 positioned on the opposite maskant coated surface of the material. Thus, the material coated with the maskant would be sandwiched between two identical pattern templates 14. Although thick materials may be chem-milled by use of a single template, it has been found that the resulting apertures will be tapered away from the template side of the material. When material of a given thickness is sandwiched between two templates and chem-milled from both sides, the end product will have holes of improved uniformity over those chem-milled from one side only.

The template 14 should be constructed of a metal which has a very high reflectivity and low laser energy absorptivity, such as aluminum or an equivalent thereto. Templates constructed of nonreflecting or low reflecting material may be plated on their outer surface with gold, copper or an equivalent material to obtain the required highly reflective surface desired. In some instances, the template may be thick in cross-section (see FIG. 4) and contain walls around the perforations with their surfaces 15 forming passageways therethrough, these passageways are interconnected to supply and return conduits 17, 19 provided for a fluid flow, for the purpose of cooling the template. The fluid could be tap water or any other fluid medium generally considered for heat absorption. Other means, such as a conduit 21 positioned around the periphery of the template with the template forming the inner surface of the conduit (see FIG. 2), may be used to cool a template having minimum thickness and, therefore, is not suitable for passages as hereinbefore described. The fluid may be circulated by pump 23 and cooled by a convenient series heat sink 25.

The chosen template 14 or templates 14, as the case may be, are firmly secured to the material 10 so that relative movement between the template or templates and material 10 does not exist and, in the instance where two templates are utilized, the holes of the templates must be properly indexed or aligned. A laser beam 18 is then scanned across the hole or pattern of the template, both templates when two are utilized pausing at each opening sufficiently long to burn away the maskant beneath. The laser can be pulsed so that the beam is only present when a hole is positioned beneath it. The template and material either being moved with respect to the laser beam or the laser beam being moved with respect to the template and material. The movable unit may be moved manually, by suitable mechanical means or by numerical control means. Any convenient type laser may be utilized to practice the invention that is capable of performing its required functions, namely, burning away the maskants beneath the hole of the template. Any commonly known laser, such as a $CO_2$ laser, provides satisfactory results.

It has been found that for energy conservation, the laser beam cross-section should be no larger than the aperture 16 in the template which it is directed through and that, to a degree, the thicker the template, the more efficient the operation. It has been found that a laser beam of greater diameter of the apertures of the template, must pass through, may be used to satisfactorily burn away the maskant but uses an excessive amount of energy and that portion of the laser beam striking the surface of the template adjacent to the aperture 16 is wasted and dissipated into the template as heat energy.

Referring now specifically to FIG. 5, the chem-milled material 10 is shown with apertures 23 therethrough positioned where the maskant 12 had been removed by the laser beam 18.

Referring now to FIG. 6, types of structures such as the one shown in this Figure and identified as material 20 are generally not compatible to the use of a template as hereinbefore described. In the instances where the use of a template is impractical for various reasons, the laser beam 18 may be applied directly on the maskant coated structure and scanned by any convenient means, such as by numerical control, for removing the maskant from a designated area. This feature is also very important where the area 22 to be etched away is of considerable size requiring continuous scanning of the laser.

It will be apparent to those skiled in the art that many modifications and variations may be effected without departing from the spirit and scope of the novel concept of the present invention.

What is claimed to be covered by United States Letters Patent is:

1. A method for producing sheet material from imperforated sheet material comprising the steps of:
    coating all the exposed surfaces of said imperforate sheet material with a chem-mill resistant maskant;
    securing a removable first template having openings therethrough to said imperforate sheet material for communicating with one coated surface thereof;
    directing a laser beam through said openings in said first template for a sufficient time to remove said maskant from said imperforate sheet material within said openings;
    removing said first template;
    chem-milling the maskant free surface of said imperforate sheet material; and
    removing the remaining maskant from the now perforated material after said chem-milling.

2. The method as defined in claim 1, additionally comprising the step of:
    securing a second removable template having openings therethrough for communicating with the side of the coated material opposite the side adjacent the first template after coating the surface of said material and prior to the step of directing said laser beam through said openings and removing said second template prior to the chem-milling step.

3. The method as defined in claim 2, including the step of aligning the aperture in said first and second templates prior to the step of directing said laser beam through said openings.

4. The method as defined in claim 1, including the step of cooling said template while directing said laser beam through said openings.

5. Apparatus for removing maskant from selected areas of a sheet of imperforate material having all surfaces coated with a maskant material for the purpose of chem-milling those selected areas to form perforations therethrough comprising:
    a first template means having openings therethrough corresponding to said selected areas positioned on one surface of said imperforate sheet material;
    a laser beam for removing the maskant material positioned beneth the openings through said first template; and
    a second identical template is positioned on the opposite side of said material from said template, the openings in said templates being aligned and said laser is utilized to remove the maskant material positioned beneath the pattern of openings through said second template.

6. The invention as defined in claim 5, wherein said first and second templates further include cooling means.

7. Apparatus for removing maskant from selected areas of a sheet of imperforate material for the purpose of chem-milling those selected areas to form perforations therethrough comprising:
    a maskant material for coating all the exposed surfaces of said imperforate sheet material;
    a first template means having the desired pattern of openings therethrough for chem-milling said selected areas positioned on one surface of said material;
    a second identical template positioned on the opposite side of said material from said first template, the openings in said templates being aligned;
    a laser beam for removing the maskant material positioned beneath said pattern of opening through said templates; and
    said first and templates include cooling means, said cooling means is a conduit around the periphery of said template for circulation of a cooling fluid therethrough.

8. Apparatus for removing maskant from selected areas of a sheet of imperforate material for the purpose of chem-milling those selected areas to form perforations therethrough comprising:
    a maskant material for coating all exposed surfaces of said imperforate sheet material;
    a first template means having openings therethrough corresponding to said selected areas positioned on one surface of said imperforate sheet material;

a second identical template positioned on the opposite side of said material from said first template, the openings in said second template being aligned;

a laser beam for removing the maskant material positioned beneath said pattern of openings through said template; and said first and second templates including cooling means, said first and second templates further include cooling means, said templates are hollow intermediate their outer surfaces with sealed tubes providing openings therethrough, said hollow portion of said templates having means for circulating a cooling fluid therethrough.

9. The invention as defined in claim 5, wherein said templates have highly reflective outer surfaces.

* * * * *